US012247139B1

(12) United States Patent
Breon et al.

(10) Patent No.: US 12,247,139 B1
(45) Date of Patent: *Mar. 11, 2025

(54) PAINT REMOVER COMPOSITIONS COMPRISING TETRAHYDROFURAN, ALKANEDIOL, AND AMINE AND METHODS OF MAKING AND USING THE SAME

(71) Applicant: W. M. BARR & COMPANY, INC., Memphis, TN (US)

(72) Inventors: Jonathan Breon, Memphis, TN (US); Tim Teague, Nesbit, MS (US); Dennis Shireman, Memphis, TN (US)

(73) Assignee: W. M. BARR & COMPANY, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/904,420

(22) Filed: Oct. 2, 2024

Related U.S. Application Data

(63) Continuation-in-part of application No. 18/627,582, filed on Apr. 5, 2024.

(60) Provisional application No. 63/567,584, filed on Mar. 20, 2024.

(51) Int. Cl.
*C11D 3/30* (2006.01)
*B08B 3/08* (2006.01)
*C09D 9/00* (2006.01)

(52) U.S. Cl.
CPC ............... *C09D 9/005* (2013.01); *B08B 3/08* (2013.01)

(58) Field of Classification Search
CPC ... C11D 3/2041; C11D 3/2044; C11D 3/2068; C11D 3/391; C11D 3/392; C11D 3/43; C11D 7/26; C11D 7/263; C11D 2111/14
See application file for complete search history.

(56) References Cited

U.S. PATENT DOCUMENTS

| | | |
|---|---|---|
| 2,551,634 A | 5/1951 | Price |
| 3,321,407 A | 5/1967 | Rosenfeld |
| 3,324,037 A | 6/1967 | Rosenfeld |
| 4,854,973 A | 8/1989 | Holdar |
| 5,308,527 A | 5/1994 | Lallier et al. |
| 5,403,402 A | 4/1995 | LeGrow |
| 5,744,437 A | 4/1998 | Rowe et al. |
| 5,780,409 A | 7/1998 | Distaso |
| 5,792,223 A | 8/1998 | Rivas et al. |
| 6,159,915 A | 12/2000 | Machac, Jr. et al. |
| 6,171,346 B1 | 1/2001 | Yeazell et al. |
| 6,200,940 B1 | 3/2001 | Vitomir |
| 6,395,103 B1 | 5/2002 | Machac, Jr. et al. |
| 6,673,157 B1 | 1/2004 | McKim et al. |
| 6,699,829 B2 | 3/2004 | Doyel et al. |
| 6,833,345 B2 | 12/2004 | Machac, Jr. et al. |
| 7,449,437 B2 | 11/2008 | Gross et al. |
| 8,119,588 B2 | 2/2012 | Bernhardt et al. |
| 8,309,502 B2 | 11/2012 | Quillen et al. |
| 9,156,809 B2 | 10/2015 | Rieth et al. |
| 9,455,447 B2 | 9/2016 | Thillaiyan et al. |
| 9,458,414 B2 | 10/2016 | Rieth et al. |
| 9,868,867 B1 | 1/2018 | Manley |
| 10,717,885 B2 | 7/2020 | Morose |
| 11,708,502 B2 | 7/2023 | Hawes et al. |
| 11,827,812 B2 | 11/2023 | Breon et al. |
| 2004/0058832 A1 | 3/2004 | Shank et al. |
| 2004/0058833 A1 | 3/2004 | Gross et al. |
| 2006/0089281 A1 | 4/2006 | Gibson |
| 2006/0258555 A1 | 11/2006 | Filippini et al. |
| 2007/0101902 A1 | 5/2007 | Frees et al. |
| 2007/0132807 A1 | 6/2007 | Ota |
| 2007/0264175 A1 | 11/2007 | Iversen et al. |
| 2008/0139437 A1 | 6/2008 | Power |
| 2010/0104947 A1 | 4/2010 | Choi et al. |
| 2010/0273696 A1 | 10/2010 | Hopfstock |
| 2010/0276149 A1 | 11/2010 | Pope et al. |
| 2012/0128614 A1 | 5/2012 | Rieth et al. |
| 2015/0014223 A1 | 1/2015 | Fan et al. |
| 2016/0040071 A1 | 2/2016 | Fan et al. |
| 2017/0042784 A1 | 2/2017 | Munk et al. |
| 2019/0106657 A1 | 4/2019 | Hawes et al. |
| 2019/0169550 A1 | 6/2019 | Hunt, Jr. et al. |
| 2019/0330481 A1 | 10/2019 | Teague et al. |
| 2020/0399480 A1 | 12/2020 | Byrd |

(Continued)

FOREIGN PATENT DOCUMENTS

| | | |
|---|---|---|
| CH | 670832 A5 | 7/1989 |
| CN | 108129905 A | 6/2018 |
| DE | 1621597 A1 | 5/1971 |

(Continued)

OTHER PUBLICATIONS

International Preliminary Report on Patentability of corresponding International Application PCT/US2018/038159; mailed on Dec. 24, 2019; (5 pages).
International Preliminary Report on Patentability of corresponding International Application PCT/US2019/029368; mailed on Oct. 27, 2020; (8 pages).
International Preliminary Report on Patentability of corresponding International Application PCT/US2018/054921; dated on Apr. 14, 2020; (6 pages).

(Continued)

*Primary Examiner* — Charles I Boyer
(74) *Attorney, Agent, or Firm* — Shumaker, Loop & Kendrick, LLP

(57) ABSTRACT

A paint remover composition including (a) tetrahydrofuran (THF) at a sufficient concentration to remove paint; (b) a low vapor pressure (LVP) coupling co-solvent present at an effective amount to maintain miscibility of the single-phase paint remover composition and to remove paint; (c) an amine with a molar volume of <100 cm$^3$/mol; and (d) water at a concentration of greater than 18 wt % of an overall concentration of the single-phase paint remover composition and the methods of making and using the same.

28 Claims, 3 Drawing Sheets

(56) References Cited

U.S. PATENT DOCUMENTS

2021/0292576 A1 9/2021 Breon et al.
2022/0389243 A1 12/2022 Breon et al.

FOREIGN PATENT DOCUMENTS

| DE | 19526351 A1 | 1/1997 |
|---|---|---|
| EP | 0867482 A2 | 7/2002 |
| JP | H1053734 A | 2/1998 |
| WO | 2003062325 A2 | 7/2003 |
| WO | 2012087775 A1 | 6/2012 |
| WO | 2015106090 A1 | 7/2015 |
| WO | 2018039415 A1 | 3/2018 |
| WO | 2018236782 A1 | 12/2018 |
| WO | 2019168919 A1 | 9/2019 |
| WO | 2020257581 A1 | 12/2020 |

OTHER PUBLICATIONS

Notice of Allowance of corresponding U.S. Appl. No. 16/011,164; issued on May 22, 2023; (8 pages).
International Preliminary Report on Patentability of corresponding International Application PCT/US2020/038635; mailed on Dec. 21, 2021; (6 pages).
International Search Report of corresponding International Application No. PCT/US2020/038635; issued on Sep. 28, 2020; (2 pages).
International Written Opinion of corresponding International Application No. PCT/US2020/038635; issued on Sep. 28, 2020; (5 pages).
"Aqua Ammonia, 26 degrees Be' Safety Data Sheet" Anderson Chemical Company (Feb. 15, 2018): pp. 1-12, p. 2.
"Ammonia 0.88 SG Technical Safety Data Sheet" Special Plasters (Jul. 15, 2009): pp. 1-4, p. 1.
"Methocel 311 Powder Hydroxypropyl Methylcellulose Sales Specification" The Dow Chemical Company (Jul. 17, 2013): pp. 1-2; entire document.
International Search Report of corresponding International Application No. PCT/US2022/032166; issued on Aug. 30, 2022; (3 pages).
International Written Opinion of corresponding International Application No. PCT/US2022/032166; issued on Aug. 30, 2022; (6 pages).
International Search Report of corresponding International Application No. PCT/US2022/032170; corrected on Nov. 10, 2022; (2 pages).
International Written Opinion of corresponding International Application No. PCT/US2022/032170; issued on Aug. 4, 2022; (4 pages).
International Search Report of corresponding International Application No. PCT/US2019/029368; issued on Jun. 20, 2019; (2 pages).
International Written Opinion of corresponding International Application No. PCT/US2019/029368; issued on Jun. 20, 2019; (7 pages).
International Search Report of corresponding International Application No. PCT/US2018/038159; issued on Sep. 6, 2018; (2 pages).
International Written Opinion of corresponding International Application No. PCT/US2018/038159; issued on Sep. 6, 2018; (4 pages).
International Search Report of corresponding International Application No. PCT/US2018/054921; issued on Dec. 14, 2018; (2 pages).
International Written Opinion of corresponding International Application No. PCT/US2018/054921; issued on Dec. 14, 2018; (5 pages).
Non-Final Office Action of corresponding U.S. Appl. No. 17/339,446; issued on Nov. 30, 2021; (9 pages).
Final Office Action of corresponding U.S. Appl. No. 17/339,446; issued on Jun. 8, 2022; (9 pages).
Non-Final Office Action of corresponding U.S. Appl. No. 17/339,446; issued on Dec. 28, 2022; (7 pages).
Non-Final Office Action of corresponding U.S. Appl. No. 16/011,164; issued on Jul. 18, 2019; (10 pages).
Final Office Action of corresponding U.S. Appl. No. 16/011,164; issued on Feb. 11, 2020; (9 pages).
Non-Final Office Action of corresponding U.S. Appl. No. 16/011,164; issued on Aug. 24, 2020; (10 pages).
Final Office Action of corresponding U.S. Appl. No. 16/011,164; issued on Apr. 2, 2021; (6 pages).
Non-Final Office Action of corresponding U.S. Appl. No. 16/011,164; issued on Oct. 13, 2021; (6 pages).
Final Office Action of corresponding U.S. Appl. No. 16/011,164; issued on Apr. 19, 2022; (6 pages).
Non-Final Office Action of corresponding U.S. Appl. No. 16/011,164; issued on Nov. 4, 2022 (5 pages).
Non-Final Office Action of corresponding U.S. Appl. No. 16/154,032; issued on Jul. 21, 2020; (14 pages).
Final Office Action of corresponding U.S. Appl. No. 16/154,032; issued on Apr. 23, 2021; (9 pages).
Non-Final Office Action of corresponding U.S. Appl. No. 16/154,032; issued on Nov. 24, 2021; (11 pages).
Final Office Action of corresponding U.S. Appl. No. 16/154,032; issued on Jul. 25, 2022; (10 pages).
Non-Final Office Action of corresponding U.S. Appl. No. 16/154,032; issued on May 9, 2023; (10 pages).
Final Office Action of corresponding U.S. Appl. No. 16/154,032; issued on Oct. 19, 2023; (11 pages).

PAINT REMOVER COMPOSITIONS COMPRISING TETRAHYDROFURAN, ALKANEDIOL, AND AMINE AND METHODS OF MAKING AND USING THE SAME

TECHNICAL FIELD

The present invention relates generally to the field of paint removers, and more particularly, to paint remover compositions having water and low vapor pressure coupling co-solvent(s) that impart stability thereto.

BACKGROUND

Many consumers use paint removers, also commonly referred to as paint strippers, for refinishing antique furniture, or woodworking's (doors, frames, moldings, etc.) in older houses. Many of these items have been painted, and repainted many times over the years. This results in items having multiple layers of paint containing different chemistry types and a different degree of difficulty from being removed. Paint removers are also used in the auto body repair industry to help with vehicle restoration.

Currently methylene chloride and N-Methylpyrrolidone (NMP) are used in the majority of paint removers in the United States. Methylene chloride has been the preferred solvent for use in paint removers for seventy years. Before methylene chloride was introduced, most paint removers consisted of volatile flammable solvents. Paint removers formulated with volatile solvents are extremely flammable and the flammability of these paint removers resulted in fires causing injury and deaths. These paint removers were rapidly replaced with the methylene chloride paint removers because methylene chloride paint removers can be formulated to be non-flammable and are effective in removing multiple layers of paint. Methylene chloride is an effective paint remover because the methylene chloride molecule can quickly penetrate multiple layers and soften or dissolve chemical resistant coatings. Methylene chloride does not deplete the ozone layer and is considered to make negligible contributions to smog formation, the green-house effect and acid rain. Like other organic solvents, methylene chloride can be harmful to human health if used improperly.

However, newer regulations are being implemented to remove methylene chloride and NMP from the environment. For example, the US Environmental Protection Agency (EPA) is considering a range of possible voluntary and regulatory actions to address risks from the use of methylene chloride-containing paint and coating removal products.

According to the EPA, NMP is both produced and imported into the United States, with use estimated at over 184 million pounds per year. The EPA estimates that approximately 9 percent of total NMP usage is for paint and coating removal products.

On Jan. 12, 2017, EPA issued a proposed rule under section 6 of the Toxic Substances Control Act with two proposed approaches for regulating NMP.

According to the EPA, one approach is to prohibit the manufacture (including import), processing, and distribution in commerce of NMP for consumer and commercial paint and coating removal; to prohibit commercial use of NMP; and to require manufacturers, processors, and distributors, except for retailers, of NMP to provide downstream notification of these prohibitions throughout the supply chain; and to require limited recordkeeping.

According to the EPA, the second approach is a combination of requirements to address unreasonable risks to workers and consumers including to limit the amount of NMP in paint removal products to no more than 35 percent by weight; require formulators to evaluate and identify specialized gloves that protect against skin absorption; require occupational users to have worker protection programs to require that workers wear personal protective equipment to prevent skin and inhalation exposures, require hazard communication for commercial users; and require warning labels for consumers with detailed information on proper ways to reduce exposure.

SUMMARY

It is an object of the invention to provide paint remover compositions that better comply with EPA and California regulations. In view of currently known paint remover compositions, the compositions disclosed herein further have increased water concentrations and decreased organic solvent levels and advantageously exhibit improved paint removal times coupled with desired shelf-life stability (i.e., no observable phase separation after predetermined period(s) at predetermined temperature(s)).

In certain aspects, disclosed is a paint remover composition, and more particularly a single-phase paint remover composition, comprising (a) tetrahydrofuran (THF) at a sufficient concentration to remove paint, i.e. from 15 wt % to 49.5 wt %, more preferably 25 wt % to 49.5 wt %, and most preferably 35 wt % to 49.5 wt %; (b) a low vapor pressure (LVP) coupling co-solvent present at an effective amount to maintain miscibility of the single-phase paint remover composition and to remove paint; (c) an amine with a molar volume of <100 $cm^3/mol$; and (d) water at a concentration of greater than 18 wt % of an overall concentration of the single-phase paint remover composition. In certain aspects, the paint remover composition, and more particularly a single-phase paint remover composition, is a liquid at ambient temperature. In certain aspects, the amine is ammonia and more preferably aqua ammonia.

In certain aspects of the paint remover composition, and more particularly a single-phase paint remover composition, wherein the LVP coupling co-solvent is present at a concentration of 1 wt % to 15 wt % of the overall concentration of the single-phase paint remover paint remover composition, and more particularly a single-phase paint remover composition, more preferably 1.5 wt % to 10 wt % of the overall concentration of the single-phase paint remover composition, and most preferably 2.5 wt % to 5 wt % of the overall concentration of the single-phase paint remover composition.

In certain aspects of the paint remover composition, and more particularly a single-phase paint remover composition, the LVP coupling co-solvent is a alkanediol, more preferably a 1,2-alkanediol.

In certain aspects of the paint remover composition, and more particularly a single-phase paint remover composition, the LVP coupling co-solvent is a hexanediol, pentanediol, or a combination thereof.

In certain aspects of the paint remover composition, and more particularly a single-phase paint remover composition, the LVP coupling co-solvent is 1,2-hexanediol, 1,2-pentanediol, or a combination thereof.

In certain aspects of the paint remover composition, and more particularly a single-phase paint remover composition, the LVP coupling co-solvent is 1,2-pentanediol.

In certain aspects of the paint remover composition, and more particularly a single-phase paint remover composition, the LVP coupling co-solvent is 1,2-hexanediol In certain aspects of the paint remover composition, and more particularly a single-phase paint remover composition, further comprises a secondary co-solvent. In this aspect, the secondary co-solvent is present at a concentration of 1 wt % to 7 wt % of the overall concentration of the single-phase paint remover composition and more preferably 2 wt % to 4 wt % of the overall concentration of the single-phase paint remover composition. In this aspect, the secondary co-solvent is water miscible, and/or the secondary co-solvent is a glycol, a glycol ether, or a combination thereof and more preferably the secondary co-solvent is an alkylene glycol, an alkylene glycol ether, or a combination thereof. In certain aspects, the secondary co-solvent is propylene glycol, diethylene glycol monobutyl ether, or a combination thereof.

In certain aspects of the paint remover composition, and more particularly a single-phase paint remover composition, the secondary co-solvent is propylene glycol, and in certain aspects is present at a concentration of 5 wt % or below of the overall concentration of the paint remover composition and more preferably at a concentration of 2.5 wt % or below overall concentration of the paint remover composition. In certain aspects and when the LVP coupling co-solvent (e.g., propylene glycol) concentration in the paint remover composition is 3 wt % or less (and more preferably 2.5 wt % or less), the secondary co-solvent is present is present at a concentration of 5 wt % or below of the overall concentration of the paint remover composition and more preferably at a concentration of 2.5 wt % or below overall concentration of the paint remover composition to further aid in miscibility of the components within the paint remover composition as well as to improve paint removal times.

In certain aspects of the paint remover composition, and more particularly a single-phase paint remover composition, the secondary co-solvent is diethylene glycol monobutyl ether. In certain aspects and when the LVP coupling co-solvent (e.g., diethylene glycol monobutyl ether) concentration in the paint remover composition is 3 wt % or less (and more preferably 2.5 wt % or less), the secondary co-solvent is present is present at a concentration of 5 wt % or below of the overall concentration of the paint remover composition and more preferably at a concentration of 2.5 wt % or below overall concentration of the paint remover composition to further aid in miscibility of the components within the paint remover composition as well as to improve paint removal times.

In certain aspects of the paint remover composition, and more particularly a single-phase paint remover composition, the LVP coupling co-solvent and the secondary co-solvent are present in the single-phase paint remover composition at a ratio ranging from 2:1 to 1:2 relative to one another, more preferably 1.5:1 to 1:1.5 relative to one another, and most preferably 1:1 relative to one another.

In certain aspects of the paint remover composition, and more particularly a single-phase paint remover composition, water is present in the single-phase paint remover composition at concentration ranging from 18 wt % to 40 wt % of the overall concentration of the single-phase paint remover composition, more preferably 20 wt % to 30 wt % of the overall concentration of the single-phase paint remover composition, and most preferably 20 wt % to 27.5 wt % of the overall concentration of the single-phase paint remover composition.

In certain aspects of the paint remover composition, and more particularly a single-phase paint remover composition, the LVP coupling co-solvent and water are present in the single-phase paint remover composition at a ratio ranging from 1:5 to 1:2 relative to one another.

In certain aspects of the paint remover composition, and more particularly a single-phase paint remover composition, further comprises a solvent evaporation retarder. In certain aspects, the solvent evaporation retarder is a paraffin wax.

In certain aspects of the paint remover composition, and more particularly a single-phase paint remover composition, further comprises a cellulosic thickener. In certain aspects, the cellulosic thickener is selected from the group consisting of hydroxypropyl methyl cellulose, hydroxypropyl cellulose, and a combination thereof.

In certain aspects of the paint remover composition, and more particularly a single-phase paint remover composition, further comprises an amine containing corrosion inhibitor.

In certain aspects of the paint remover composition, and more particularly a single-phase paint remover composition, the single-phase paint remover composition remains stable and exhibits no phase separation at a temperature of 50° C. for twenty-eight (28) days.

In certain aspects of the paint remover composition, and more particularly a single-phase paint remover composition, has a viscosity ranging from 1,000 cP to 20,000 cP at 20° C., more preferably 3,000 cP to 15,000 cP at 20° C., most preferably 5,000 cP to 10,000 cP at 20° C. Viscosities in these ranges provide for the ideal balance of application properties, including but not limited to, spreadability, coverage, and vertical cling.

Also disclosed herein are methods of making the paint remover composition, more particularly the single-phase paint remover composition. The method includes: (a) admixing tetrahydrofuran (THF) at a sufficient concentration to remove paint, i.e. from 15 wt % to 49.5 wt %, more preferably 25 wt % to 49.5 wt %, and most preferably 35 wt % to 49.5 wt %, with at least a (i) a low vapor pressure (LVP) coupling co-solvent present at an effective amount to maintain miscibility of the single-phase paint remover composition and to remove paint; (ii) an amine with a molar volume of <100 cm$^3$/mol; and (iii) water at a concentration of greater than 18 wt % of an overall concentration of the single-phase paint remover composition; and (b) forming the single-phase paint remover composition. In certain aspects, the amine is ammonia and more preferably aqua ammonia.

In certain aspects of the method of making paint remover composition, the LVP coupling co-solvent is present at a concentration of 1 wt % to 15 wt % of the overall concentration of the single-phase paint remover composition, more preferably 1.5 wt % to 10 wt % of the overall concentration of the single-phase paint remover composition, and most preferably 2.5 wt % to 5 wt % of the overall concentration of the single-phase paint remover composition.

In certain aspects of the method of making paint remover composition, the LVP coupling co-solvent is an alkanediol, more preferably a 1,2-alkanediol.

In certain aspects of the method of making paint remover composition, the LVP coupling co-solvent is a hexanediol, pentanediol, or a combination thereof.

In certain aspects of the method of making paint remover composition, the LVP coupling co-solvent is 1,2-hexanediol, 1,2-pentanediol, or a combination thereof.

In certain aspects of the method of making paint remover composition, the LVP coupling co-solvent is 1,2-pentanediol or the LVP coupling co-solvent is 1,2-hexanediol.

In certain aspects of the method of making paint remover composition, the paint remover further comprises a secondary co-solvent.

In certain aspects of the method of making paint remover composition, the secondary co-solvent is water miscible, and/or the secondary co-solvent is present at a concentration of 1 wt % to 15 wt % of the overall concentration of the single-phase paint remover paint remover composition, and more particularly a single-phase paint remover composition, more preferably 1.5 wt % to 10 wt % of the overall concentration of the single-phase paint remover composition, and most preferably 2.5 wt % to 5 wt % of the overall concentration of the single-phase paint remover composition.

In certain aspects of the method of making paint remover composition, the secondary co-solvent is a glycol, a glycol ether, or a combination thereof.

In certain aspects of the method of making paint remover composition, the secondary co-solvent is an alkylene glycol, an alkylene glycol ether, or a combination thereof.

In certain aspects of the method of making paint remover composition, the secondary co-solvent is propylene glycol, diethylene glycol monobutyl ether, or a combination thereof.

In certain aspects of the method of making paint remover composition, the secondary co-solvent is propylene glycol.

In certain aspects of the method of making paint remover composition, the secondary co-solvent is diethylene glycol monobutyl ether.

In certain aspects of the method of making paint remover composition, the LVP coupling co-solvent and the secondary co-solvent are present in the single-phase paint remover composition at a ratio ranging from 2:1 to 1:2 relative to one another, more preferably 1.5:1 to 1:1.5 relative to one another, and most preferably 1:1 relative to one another.

In certain aspects of the method of making paint remover composition, water is present in the single-phase paint remover composition at concentration ranging from 18 wt % to 40 wt % of the overall concentration of the single-phase paint remover composition, more preferably 20 wt % to 30 wt % of the overall concentration of the single-phase paint remover composition, and most preferably 20 wt % to 27.5 wt % of the overall concentration of the single-phase paint remover composition.

In certain aspects of the method of making paint remover composition, the paint remover composition further comprises a solvent evaporation retarder.

In certain aspects of the method of making paint remover composition, the solvent evaporation retarder is a paraffin wax.

In certain aspects of the method of making paint remover composition, the paint remover composition further comprises a cellulosic thickener.

In certain aspects of the method of making paint remover composition, the cellulosic thickener is selected from the group consisting of hydroxypropyl methyl cellulose, hydroxypropyl cellulose, and a combination thereof.

In certain aspects of the method of making paint remover composition, the paint remover composition further comprises an amine containing corrosion inhibitor.

In certain aspects of the method of making paint remover composition, the single-phase paint remover composition remains stable and exhibits no phase separation at a temperature of 50° C. for twenty-eight (28) days.

In certain aspects of the method of making paint remover composition, the single-phase paint remover composition has a viscosity ranging from 1,000 cP to 20,000 cP at 20° C., more preferably 3,000 cP to 15,000 cP at 20° C., most preferably 5,000 cP to 10,000 cP at 20° C. Viscosities in these ranges provide for the ideal balance of application properties, including but not limited to, spreadability, coverage and vertical cling.

In certain aspects of the method of making paint remover composition, the LVP coupling co-solvent and water are present in the single-phase paint remover composition at a ratio ranging from 1:5 to 1:2 relative to one another.

Also disclosed is a method of removing paint comprising: (a) applying the single-phase paint remover composition disclosed herein to a painted surface for a predetermined time period; and (b) after step (a), removing paint from the painted surface.

In certain aspects of the method of removing paint, the predetermined time period ranges for 5 minutes to 300 minutes, more preferably 5 minutes to 120 minutes, and most preferably 5 minutes to 30 minutes.

In certain aspects of the method of removing paint, the painted surface is a single coating of paint.

In certain aspects of the method of removing paint, the painted surface includes a plurality of paint coatings.

In certain aspects of the method of removing paint, the plurality of paint coatings includes at least two of a clear top coating, a base paint coating, a primer, or any combination thereof.

In certain aspects of the method of removing paint, the plurality of paint coatings includes each of a clear top coating, a base paint coating, a primer, or any combination thereof.

In certain aspects of the method of removing paint, the plurality of paint coatings includes a clear top coating and a base paint coating.

In certain aspects of the method of removing paint, the plurality of paint coatings includes a base paint coating and a primer.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
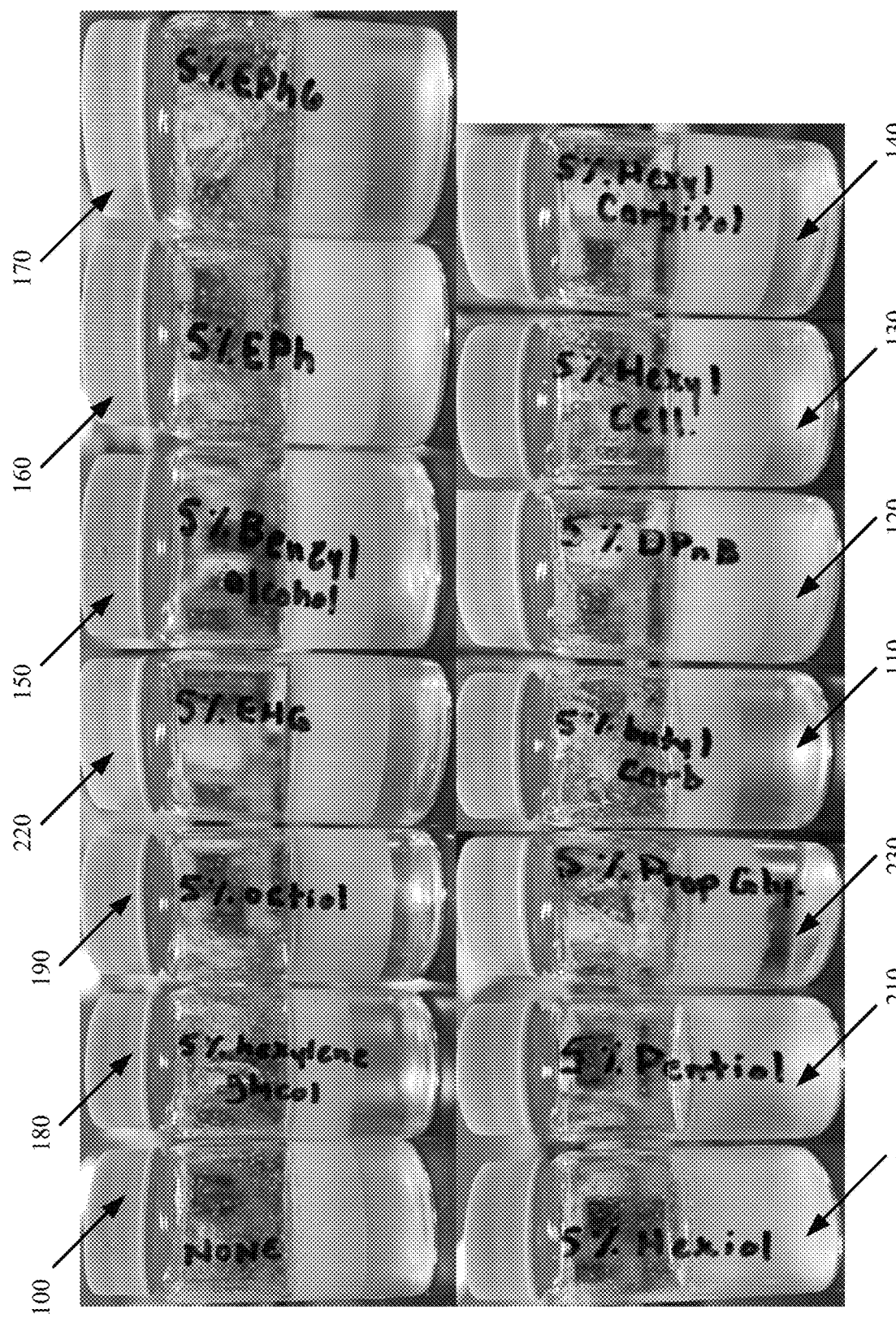
FIG. 1, and in view of Tables 1 and 2 provided herein, is a photograph showing phase separation results of the base paint formulation without an LVP coupling co-solvent or the base paint formulation with 5% LVP coupling co-solvent added thereto.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use and practice the invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described. The above further applies to any disclosed ratios and/or range of ratios disclosed herein as well as predetermined time ranges.

Title 17, California Code of Regulations, section 94508 of the California Air Resources Board (CARB) defines low vapor pressure volatile organic compounds (LVP-VOC), which include low vapor pressure solvents (and/or low vapor pressure coupling co-solvents (i.e. a co-solvent used in a multi-solvent system)), as a chemical "compound" or "mixture" that contains at least one carbon atom and meets one of the following:

(A) has a vapor pressure less than 0.1 mm Hg at 20° C. as determined by CARB Method 310 (CARB Method 310 as Amended Aug. 1, 2022 see: https://ww2.arb.ca.gov/sites/default/files/2022-10/CARB_Method310_MLD_SAS_0801202 2.pdf accessed Mar. 12, 2024); or (B) is a chemical "compound" with more than 12 carbon atoms, or a chemical "mixture" comprised solely of "compounds" with more than 12 carbon atoms, as verified by formulation data, and the vapor pressure and boiling point are unknown; or (C) is a chemical "compound" with a boiling point greater than 216° C., as determined by CAR3 Method 310; or (D) is the weight percent of a chemical "mixture" that boils above 216° C., as determined by CARB Method 310.

A chemical "compound" as used above means a molecule of definite chemical formula and isomeric structure, and a chemical "mixture" as used above means a substance comprised of two or more chemical "compounds."

Paint Remover Composition

Provided herein are paint remover compositions that better comply with EPA and California regulations by including low vapor pressure solvents and water in the disclosed paint remover. In view of currently known paint remover compositions, the compositions disclosed herein further have increased water concentrations and decreased organic solvent levels (particularly decreased volatile organic solvents) and advantageously/unexpectedly exhibit improved paint removal times coupled with desired shelf-life stability (i.e., no observable phase separation after predetermined periods of time at predetermined temperature(s)). The paint remover compositions disclosed herein are suitable for chemically stripping paint of various kinds on various surfaces including but not limited to automotive paints and wall paints applied to, for example, porous and non-porous surfaces.

The disclosed paint remover compositions are preferably a miscible, single-phase paint remover composition is a liquid at ambient temperature and exhibits no visibly observable phase separation 28 days post-mixing/formulating at a temperature of 50° C. This property is particularly important for shelf-life and efficacy purpose as paint remover compositions that separate into one or more phases disadvantageously require frequent mixing by a user.

The paint remover composition (single-phase paint remover composition) includes (a) tetrahydrofuran ((THF) (CAS No. 109-99-9)) (e.g., as a primary organic solvent) at a sufficient concentration to remove paint, i.e. from 15 wt % to 49.5 wt %, more preferably 25 wt % to 49.5 wt %, and most preferably 35 wt % to 49.5 wt %; (b) a low vapor pressure (LVP) coupling co-solvent (e.g., secondary organic solvent) present at an effective amount to maintain miscibility of the single-phase paint remover composition and to remove paint; (c) an amine with a molar volume of <100 cm$^3$/mol; and (d) water at a concentration of greater than 18 wt % of an overall concentration of the single-phase paint remover composition.

The solvent systems used in the disclosed paint remover compositions (single-phase paint remover composition) advantageously provide for fast and complete removal of cross-linked multi-layer coating systems, such as those found on motor vehicles. In certain aspects of the paint remover composition, and more particularly a single-phase paint remover composition, wherein the LVP coupling co-solvent is present at a concentration of 1 wt % to 15 wt % of the overall concentration of the single-phase paint remover paint remover composition, and more particularly a single-phase paint remover composition, more preferably 1.5 wt % to 10 wt % of the overall concentration of the single-phase paint remover composition, and most preferably 2.5 wt % to 5 wt % of the overall concentration of the single-phase paint remover composition. The LVP coupling co-solvent is an alkanediol present in the paint remover in above-mentioned concentrations, more preferably a 1,2-alkanediol present in the paint remover in above-mentioned concentrations. In certain aspects of the paint remover composition, and more particularly a single-phase paint remover composition, the LVP coupling co-solvent is a hexanediol, pentanediol, or a combination thereof present in the paint remover in above-mentioned concentrations, and in preferred embodiments, the LVP coupling co-solvent is 1,2-hexanediol (CAS No. 6920-22-5), 1,2-pentanediol (CAS No. 5343-92-0), or a combination thereof present in the paint remover in above-mentioned concentrations. In certain aspects of the paint remover composition, and more particularly a single-phase paint remover composition, the LVP coupling co-solvent is 1,2-pentanediol present in the paint remover in above-mentioned concentrations. In certain aspects of the paint remover composition, and more particularly a single-phase paint remover composition, the LVP coupling co-solvent is 1,2-hexanediol present in the paint remover in above-mentioned concentrations. Moreover and as further evidenced by the Working Examples, there is an unexpected synergy between THF and the LVP coupling co-solvent when present in the concentrations disclosed herein and when water at a concentration of greater than 18 wt % of an overall concentration of the single-phase paint remover compositions. In particular, paint removal times are unexpectedly improved especially when compared with other organic solvent/paint remover systems having less water therein.

While the above-mentioned alkanediols are particularly effective in the disclosed paint removers herein, alkanediols are expensive to produce. Thus, leading to expensive manufacturing costs downstream as well as increased end-user expense when preparing compositions/formulations having the above-mentioned alkanediols therein.

To reduce production costs, while further maintaining paint remover efficacy exhibited by formulations solely using the above-mentioned alkanediols as LVP co-solvents (and/or while achieving similar paint removal times), an effective secondary co-solvent (a tertiary organic solvent in the composition) was identified, which can be further added to the disclosed paint remover compositions and advantageously allows for lower alkanediol concentrations in the disclosed paint removers. Moreover and as further evidenced by the Working Examples, there is an unexpected synergy between THF, the LVP coupling co-solvent, and the secondary co-solvent when present in the concentrations disclosed herein and when water at a concentration of greater than 18 wt % of an overall concentration of the single-phase paint remover compositions. In particular, paint removal times are unexpectedly improved especially in view of comparative formulations having other organic solvent/paint remover systems that include less water therein.

In this aspect, the single-phase paint remover composition, further includes a secondary co-solvent (a tertiary organic solvent in the composition) present at a concentration of 1 wt % to 7 wt % of the overall concentration of the single-phase paint remover composition and more preferably 2 wt % to 4 wt % of the overall concentration of the single-phase paint remover composition. In this aspect, the secondary co-solvent is water miscible, and/or the secondary co-solvent is a glycol, a glycol ether, or a combination thereof present in the paint remover in above-mentioned concentrations and more preferably the secondary co-solvent is an alkylene glycol, an alkylene glycol ether, or a combination thereof present in the paint remover in above-mentioned concentrations. In certain aspects, the secondary co-solvent is propylene glycol (CAS No. 57-55-6), diethylene glycol monobutyl ether (CAS No. 112-34-5), or a combination thereof.

In certain aspects of the paint remover composition, and more particularly a single-phase paint remover composition, the secondary co-solvent is propylene glycol, and in certain aspects is present in the paint remover composition and is at a concentration of 5 wt % or less of the overall concentration of the paint remover composition and more preferably at a concentration of 2.5 wt % or less overall concentration of the paint remover composition. In certain aspects and when the LVP coupling co-solvent concentration in the paint remover composition is 3 wt % or less (and more preferably 2.5 wt % or less), the secondary co-solvent (e.g., propylene glycol) is present is present at a concentration of 5 wt % or below of the overall concentration of the paint remover composition and more preferably at a concentration of 2.5 wt % or below overall concentration of the paint remover composition to further aid in miscibility of the components within the paint remover composition as well as to improve paint removal times. In certain aspects, propylene glycol is present in the paint remover at a concentration ranging from 0.5 wt % to 7 wt % of the overall concentration of the paint remover composition, preferably 1.5 wt % to 6 wt % of the overall concentration of the paint remover composition, more preferably from 2.0 wt % to 5.5 wt % of the overall concentration of the paint remover composition, and even more preferably from 2.5 wt % to 5.0 wt % of the overall concentration of the paint remover composition. In certain aspects, the ratio of THF to LVP in the paint remover composition is from 20:1 to 5:1, more preferably from 20:1 to 8:1, and most preferably from 20:1 to 10:1 relative to one another.

In certain aspects of the paint remover composition, and more particularly a single-phase paint remover composition, the secondary co-solvent is diethylene glycol monobutyl ether. In certain aspects and when the LVP coupling co-solvent is present and at a concentration in the paint remover composition is 3 wt % or less (and more preferably 2.5 wt % or less), the secondary co-solvent (e.g., diethylene glycol monobutyl ether) is present in the paint remover compositions and has a concentration of 5 wt % or less of the overall concentration of the paint remover composition and more preferably at a concentration of 2.5 wt % or less overall concentration of the paint remover composition to further aid in miscibility of the components within the paint remover composition as well as to improve paint removal times. In certain aspects, diethylene glycol monobutyl ether is present in the paint remover at a concentration ranging from 0.5 wt % to 7 wt % of the overall concentration of the paint remover composition, preferably 1.5 wt % to 6 wt % of the overall concentration of the paint remover composition, more preferably from 2.0 wt % to 5.5 wt % of the overall concentration of the paint remover composition, and even more preferably from 2.5 wt % to 5.0 wt % of the overall concentration of the paint remover composition.

In view of the above disclosures, when both the LVP coupling co-solvent and the secondary co-solvent are present in the single-phase paint remover composition, the LVP coupling co-solvent and the secondary co-solvent are present at a ratio ranging from 2:1 to 1:2 relative to one another, more preferably 1.5:1 to 1:1.5 relative to one another, and most preferably 1:1 relative to one another. In certain instances, when the 2:1 to 1:2 ratios of LVP coupling co-solvent and the secondary co-solvent are exceeded phase separation of the remover will occur upon aging/stored for prolonged time periods and paint removal times are insufficient/undesirable.

As alluded to above, water is present in the disclosed paint removers at rather high concentrations especially when compared to conventional paint removers. In particular, water is present in the single phase paint remover composition at concentration ranging from 18 wt % to 40 wt % of the overall concentration of the single-phase paint remover composition, more preferably 20 wt % to 30 wt % of the overall concentration of the single-phase paint remover composition, and most preferably 20 wt % to 27.5 wt % of the overall concentration of the single-phase paint remover composition.

Likewise, an amine/amine containing component is present in the disclosed paint remover. The molar volume of the amine may be s100 cm$^3$/mol and more preferably may be <30 cm$^3$/mol. In certain aspects, the amine/amine containing component is present in the remover composition at concentration ranging from 2.5 wt % to 20 wt % of the overall concentration of the single-phase paint remover composition, more preferably 5 wt % to 20 wt % of the overall concentration of the single-phase paint remover composition, and most preferably 10 wt % to 20 wt % of the overall concentration of the single-phase paint remover composition. The amine is selected from the group consisting of ammonia (CAS No. 7664-41-7) and/or aqua ammonia (CAS No. 1336-21-6), hydroxylamine (CAS No. 5470-11-1), dimethylamine (CAS No. 124-40-3), ethanolamine (CAS No. 141-43-5), pyrrolidine (CAS No. 123-75-1), and a combination thereof.

Other components may be present in the formulation for paint removal. Non-limiting examples of other such components include, but are not limited to, dye, paraffin wax (present in a sufficient amount to act as a solvent evaporation retarder), antioxidant, surfactant, thickener, fumed silica, corrosion inhibitor, ammonia, peroxide inhibitor (including but not limited to butylated hydroxytoluene), or a combination thereof. The composition may further comprise a cellulosic thickener. Non-limiting examples of cellulosic thickeners are hydroxypropyl methyl cellulose, hydroxypropyl cellulose, and a combination thereof. The composition may comprise an amine containing corrosion inhibitor.

In addition to the above mentioned amines/amine containing components, the disclosed paint removers may further include amine containing corrosion inhibitors. These amine containing corrosion inhibitors include, but are not limited to, primary, secondary, tertiary or quaternary amines, aliphatic, cycloaliphatic or aromatic amines, polyamines, amine salts, such as amine-mineral acid salts, amine-nitrites, amine-carboxylates, amine-phosphates, amine-borates, alkanolamines or alkanolamine-borate complexes, amine-metal complexes, amine containing heterocycles, azoles, and mixtures thereof.

In certain aspects, the above-mentioned other components, cellulosic inhibitors, and/or amine containing corrosion inhibitors, alone or in combination, may be added in a range of 0 weight % to 25 weight %, more preferably 0.01 weight % to 12.5 weight %. In certain aspects of the paint remover composition, and more particularly a single-phase paint remover composition, has a viscosity ranging from 1,000 cP to 20,000 cP at 20° C., more preferably 3,000 cP to 15,000 cP at 20° C., most preferably 5,000 cP to 10,000 cP at 20° C. Viscosities in these ranges provide for the ideal balance of application properties, including but not limited to, spreadability, coverage and vertical cling.

A method of making the disclosed paint remover/single-phase paint remover composition comprising: (a) admixing tetrahydrofuran (THF) at a sufficient concentration to remove paint, i.e. from 15 wt % to 49.5 wt %, more preferably 25 wt % to 49.5 wt %, and most preferably 35 wt % to 49.5 wt %, with a: (i) a low vapor pressure (LVP) coupling co-solvent present at an effective amount to maintain miscibility of the single-phase paint remover composition and to remove paint; (ii) an amine with a molar volume of <100 cm$^3$/mol; and (iii) water at a concentration of greater than 18 wt % of an overall concentration of the single-phase paint remover composition; and (b) forming the disclosed paint remover/single-phase paint remover composition.

Method of Removing Paint

Also disclosed is a method of removing paint including (a) applying the single-phase paint remover composition disclosed herein to a painted surface for a predetermined time period; and (b) after step (a), removing paint from the painted surface by wiping, scraping, blasting or rinsing. As alluded to above, the disclosed paint remover compositions are suitable for chemically stripping paint of various kinds on various surfaces. The paints include, for example, automotive paints having a plurality of layers (i.e., a primer layer, a base/pigment layer, and a top coat/clear layer) and/or wall paints. In certain aspects, the paints that will be removed have been applied to, for example, porous (sheetrock/gypsum board) and/or non-pomus surfaces (metal or glass substrates).

In certain aspects of the method of removing paint, the predetermined time period ranges for 5 minutes to 300 minutes, more preferably 5 minutes to 120 minutes, and most preferably 5 minutes to 30 minutes. In certain aspects and either during the predetermined time period or directly after the predetermined time period, at least 50% of the paint has been removed from the painted surface when observed visually, at least 65% of the paint has been removed from the painted surface when observed visually, at least 75% of the paint has been removed from the painted surface when observed visually, at least 90% of the paint has been removed from the painted surface when observed visually, at least 95% of the paint has been removed from the painted surface when observed visually, at least 97.5% of the paint has been removed from the painted surface when observed visually, at least 99% of the paint has been removed from the painted surface when observed visually, or at least 100% of the paint has been removed from the painted surface when observed visually,

WORKING EXAMPLES

Table 1 shows a base formula that that omits any alkanediol, LVP coupling co-solvent. As shown in FIG. 1, the base formula was unstable exhibiting phase separation within five (5) minutes after mixing and viscosity decreases after initial mixing. Frequent mixing was necessary to avoid phase separation was shaken until homogenous.

TABLE 1

Base formula for evaluation of LVP coupling solvents

| Ingredient (wt %) | V1.02-base formula |
|---|---|
| Tetrahydrofuran | 49.5 |
| Surfactant[1] | 1 |
| Paraffin wax | 0.25 |

TABLE 1-continued

Base formula for evaluation of LVP coupling solvents

| Ingredient (wt %) | V1.02-base formula |
|---|---|
| Hydroxypropyl methyl cellulose | 1 |
| DI water | 28.25 |
| 28-30% Aqua ammonia | 15 |
| Surfadone LP-100[2] | 5 |

Figure 2:
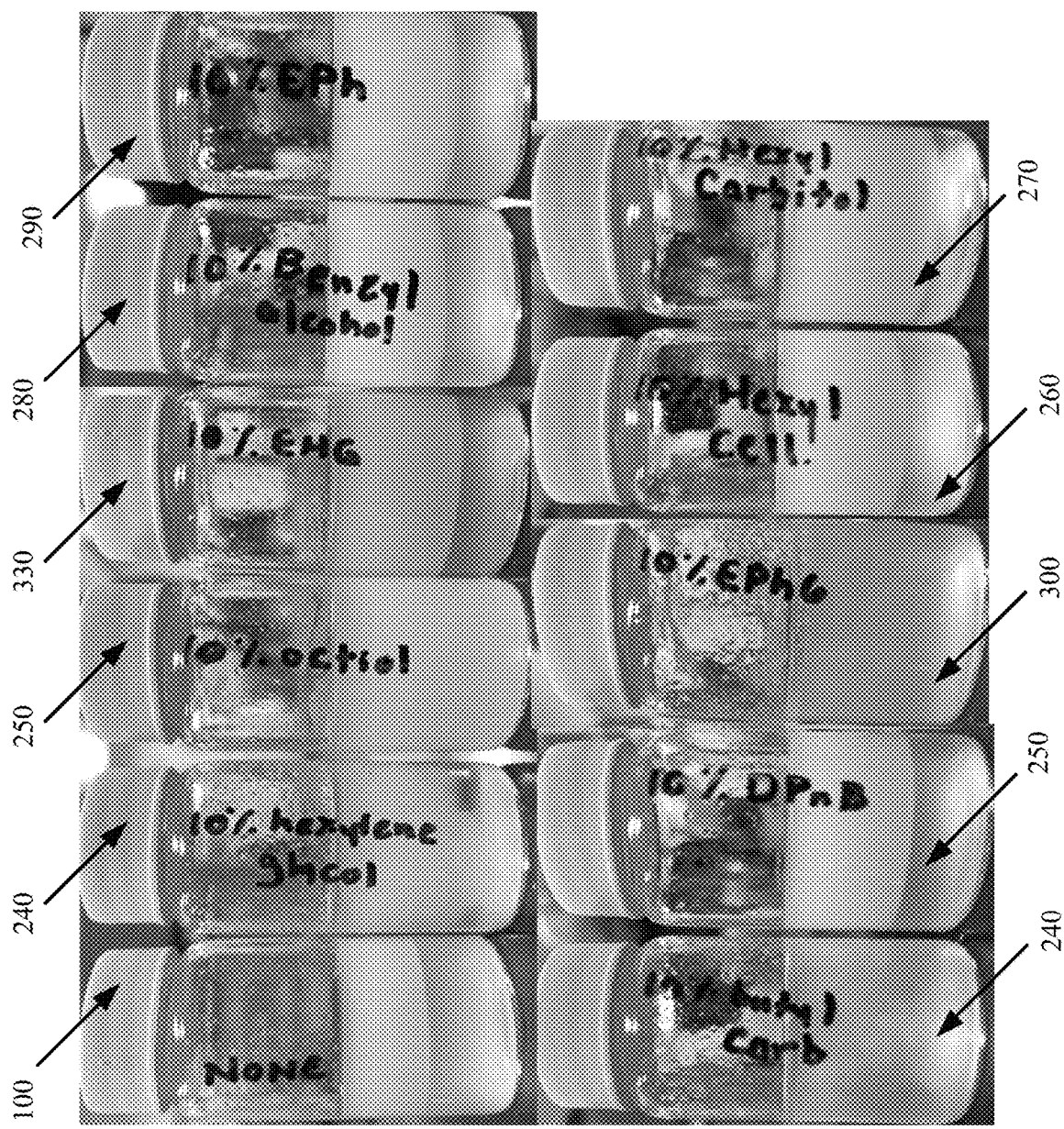
FIG. 2, and in view of Tables 1 and 2 provided herein, is a photograph showing phase separation results of the base paint formulation without an LVP coupling co-solvent or the base paint formulation with 10% LVP coupling co-solvent added thereto.
Figure 3:
FIG. 3, and in view of Tables 5 and 6 provided herein, is a photograph depicting phase separation and stability results of various exemplary (e.g., V1.40, V1.44 and V1.45) and comparative paint remover compositions/formulations after 28 days of being stored at 50° C.

[1]Nonionic alcohol ethoxylate surfactant
[2]Surfadone LP-100 is n-octylpyrrolidone commercially available from Ashland Table 2 and FIGS. 1 and 2 show the base formulation (100) (shown in Table 1) including various different LVP coupling co-solvents at various concentrations (i.e., 5% and/or 10% by wt) added thereto. In view of Table 1, only water concentrations were varied to account for the added LVP coupling co-solvent(s). After preparing and mixing (homogeneously mixing) the formulas shown in Table 2 and a further shown in the photographs in FIGS. 1 and 2, formula stability was evaluated after storage on a flat surface for 24 hrs at room temperature. As shown in FIG. 1 and Table 2, formulations with 5 wt % 1, 2 hexanediol (LVP couple co-solvent) and formulations with 5 wt % 1,2 pentanediol (LVP couple co-solvent) exhibited no phase separation, while all other formulations exhibited phase separation at 5 wt %.

TABLE 2

Evaluation of post-addition of 5% and 10% LVP coupling solvents to base formula V1.02

| Coupling Solvent | 5% | 10% | Observations |
|---|---|---|---|
| Butyl Carbitol | 2 phase (110) | 1 phase (240) | 10%-moderate clarity, third highest viscosity |
| Dowanol DPnB | 2 phase (120) | 2 phase (250) | |
| Hexyl Cellosolve | 2 phase (130) | 2 phase (260) | |
| Hexyl Carbitol | 2 phase (140) | 2 phase (270) | |
| Benzyl alcohol | 2 phase (150) | 2 phase (280) | |
| Dowanol EPh | 2 phase (160) | 2 phase (290) | |
| Dowanol EPh6 | 2 phase (170) | 1 phase (300) | 10%-most clear, third highest viscosity |
| Hexylene glycol (2-Methyl-2,4-pentanediol) | 2 phase (180) | 2 phase (310) | |
| Octiol (1,2-Octanediol) | 2 phase (190) | 1 phase (loose) (320) | 10%-Opaque, lowest viscosity |
| Hexiol (1,2-Hexanediol) | 1 phase (200) | N/A | 5%-hazy, second highest viscosity |
| Pentiol (1,2-Pentanediol) | 1 phase (210) | N/A | 5%-moderate clarity, highest viscosity |
| Ethylhexyl glycerine (EHG) | 2 phase (220) | 2 phase (330) | 5%-slightly yellow; 10%-very yellow |
| Propylene glycol | 2 phase (230) | 2 phase (340) | |

Tables 3 and 4 depict additional exemplary formulations (V1.17, V.1.3, V1.16) having 5 wt % of 1,2-pentanediol (LVP couple co-solvent) and exemplary formulation V1.15 having 10 wt % diethylene glycol monobutyl ether (LVP couple co-solvent) as well as the paint removal times when compared with a comparative example (i.e., "Comp. 1" in Table 4, which is the paint remover formula of Example 2 in U.S. Pat. No. 11,827,812).

TABLE 3

Comparison of Coupling solvent and water Levels on Stripping Time

| Ingredient (wt %) | V1.17 | V1.13 | V1.16 | V1.15 |
|---|---|---|---|---|
| Tetrahydrofuran | 49.5 | 49.5 | 49.5 | 49.5 |
| Surfactant | 1 | 1 | 1 | 1 |
| Paraffin wax | 0.15 | 0.15 | 0.15 | 0.15 |
| Hydroxypropyl methyl cellulose | 1.25 | 1.25 | 1.25 | 1.25 |
| DI water | 20.6 | 15.6 | 10.6 | 10.6 |
| 28-30% Aqua ammonia | 15 | 15 | 15 | 15 |
| 1,2-Pentanediol | 5 | 5 | 5 | — |
| Surfadone LP-100 | — | 5 | 10 | — |
| Diethylene glycol monobutyl ether | — | — | — | 10 |
| Additives | 2.5 | 2.5 | 2.5 | 2.5 |

TABLE 4

Comparison of Time (min) to Strip paint from 2017 Nissan Ultima hood

| Ex. | Total Coupling solvent (wt. %) | Total water (wt. %) | H₂O: Coupling solvent ratio | Spot 1 (min) | Spot 2 (min) | Layers stripped |
|---|---|---|---|---|---|---|
| Comp. 1 | — | 3.5% | N/A | 285 | 292 | Clear/base/some primer |
| V1.17 | 5 | 25.1% | 5.02 | 153 | 156 | Clear/base/primer |
| V1.13 | 10 | 20.1% | 2.01 | 168 | 168 | Clear/base/primer |
| V1.15 | 15 | 15.1% | 1.01 | 189 | 204 | Clear/base/primer |
| V1.16 | 10 | 20.1% | 2.01 | 168 | 171 | Clear/base/primer |

*Comp. 1 is paint remover formula according to Example 2 of U.S. Pat. No. 11,827,812.

Table 4 demonstrates unexpectedly that formulas with increased water levels and decreased coupling solvent levels demonstrate shorter time to strip automotive paint.

Tables 5 and 6 depict additional exemplary formulations (V1.40) having 5 wt % of 1,2-pentanediol and exemplary formulations V1.44 (having 2.5 wt % of 1,2-pentanediol (LVP couple co-solvent) and 2.5 wt % diethylene glycol monobutyl ether (secondary co-solvent)) and V1.45 (having 2.5 wt % of 1,2-pentanediol (LVP couple co-solvent), and 2.5 wt % propylene glycol (secondary co-solvent)) as well as the paint removal times when compared with a comparative example (i.e., "Comp. 1" in Table 4, which is the paint remover formula of Example 2 in U.S. Pat. No. 11,827,812). Comparative examples (V1.38, V1.39, V1.41, V1.43, and V1.46) are further shown in Table 5. Stability data of each formulation in Table 5 is shown in Table 6. Only formulations V1.40, V1.44, V1.45, and V1.54 exhibited the desired stability (i.e., no phase separation) post-storage for twenty-eight (28) days at 50° C. (with no intermittent mixing, etc. during storage).

TABLE 5

Evaluation of coupling solvents in THF-ammonia-water formulas

| Ingredient (wt %) | V1.38 (350) | V1.39 (360) | V1.40 (370) | V1.41 (380) |
|---|---|---|---|---|
| Tetrahydrofuran | 49.5 | 49.5 | 49.5 | 49.5 |
| Surfactant | 1 | 1 | 1 | 1 |
| Paraffin wax | 0.15 | 0.15 | 0.15 | 0.15 |
| Hydroxypropyl methyl cellulose | 1.25 | 1.25 | 1.25 | 1.25 |
| DI water | 30.575 | 25.575 | 25.575 | 25.575 |
| 28-30% Aqua ammonia | 15 | 15 | 15 | 15 |
| 1,2-Pentanediol | — | — | 5 | — |
| Propylene glycol | — | — | — | 5 |
| Diethylene glycol monobutyl ether | — | 5 | — | — |
| Additives | 2.525 | 2.525 | 2.525 | 2.525 |
| Ratio of THF:LVP | — | — | 9.9:1 | 9.9:1 |

| Ingredient (wt %) | V1.43 (390) | V1.44 (400) | V1.45 (410) | V1.46 (420) | V1.54 |
|---|---|---|---|---|---|
| Tetrahydrofuran | 49.5 | 49.5 | 49.5 | 49.5 | 15 |
| 1,3-dioxolane | — | — | — | — | 34.5 |
| Surfactant | 1 | 1 | 1 | 1 | 1 |
| Paraffin wax | 0.15 | 0.15 | 0.15 | 0.15 | 0.15 |
| Hydroxypropyl methyl cellulose | 1.25 | 1.25 | 1.25 | 1.25 | 1.25 |
| DI water | 28.075 | 25.575 | 25.575 | 25.575 | 25.575 |
| 28-30% Aqua ammonia | 15 | 15 | 15 | 15 | 15 |
| 1,2-Pentanediol | 2.5 | 2.5 | 2.5 | — | 2.5 |
| Propylene glycol | — | — | 2.5 | 2.5 | 2.5 |
| Diethylene glycol monbutyl ether | — | 2.5 | — | 2.5 | — |
| Additives | 2.525 | 2.525 | 2.525 | 2.525 | 2.525 |
| Ratio of THF:LVP | 19.8:1 | 19.8:1 | 19.8:1 | 19.8:1 | 6:1 |

TABLE 6

Formula Stability after 28 days at 50° C. (Shelf Storage Stability)

| | |
|---|---|
| V1.38 | Phase separation (2 layers); top layer white opaque; viscosity drop |
| V1.39 | Slight phase separation (2 layers); top layer white opaque; loose gel |
| V1.40 | No phase separation (1 layer); clear, slightly hazy; no viscosity change |
| V1.41 | Phase separation (2 layers); top layer white opaque; viscosity drop |
| V1.43 | Phase separation (2 layers); top layer white opaque; viscosity drop |
| V1.44 | No phase separation (1 layer); clear, slightly hazy; no viscosity change |
| V1.45 | No phase separation (1 layer); clear, slightly hazy; no viscosity change |

TABLE 6-continued

Formula Stability after 28 days at 50° C. (Shelf Storage Stability)

| | |
|---|---|
| V1.46 | Phase separation (2 layers); top layer white opaque; viscosity drop |
| V1.54* | No phase separation (1 layer); hazy opaque; no viscosity change |

*stability after one week at room temperature.

Table 7 depicts and additional exemplary formulation (V1.49) having 2.5 wt % of 1,2-pentanediol (LVP couple co-solvent) and 2.5 wt % propylene glycol (secondary co-solvent) and additional Comparative Examples (V1.42 and V1.47). Table 8 depicts paint removal times of the formulations shown in Table 7. Paint remover formulations from Table 7 were poured on a horizontal painted surface (painted white car door) and spread thereon to provide coverage of approximately 1/16 inch over the painted surface. After application to the painted surface, the paint having remover thereon was visually observed to determine when the painted appeared to be raised/lifted from the substrate (i.e., metal surface of the car door). Times are shown in Table 8. After observed raised/lifted paint, the raised/lifted paint was wiped away/removed with a plastic scraper. As further shown in Table 8, exhibited markedly better paint removal times when compare with Comparative Examples (V1.42 and V1.47)

Evaluation of Stripping Performance on White Car Door

TABLE 7

Evaluation of VOC Compliant Cosolvents in THF-ammonia paint remover formulas

| Ingredient (wt %) | V1.42 (comparative) | V1.47 (comparative) | V1.49 |
|---|---|---|---|
| Tetrahydrofuran | 49.5 | 49.5 | 49.5 |
| Surfactant | 1 | 1 | 1 |
| Paraffin wax | 0.5 | 0.5 | 0.15 |
| Hydroxypropyl methyl cellulose | 1 | 1 | 1.25 |
| Isopropylidene glycerol* | 33 | — | — |
| Benzyl alcohol* | — | 33 | — |
| Tap water | — | — | 25.575 |
| 28-30% Aqua ammonia | 15 | 15 | 15 |
| 1,2-Pentanediol | — | — | 2.5 |
| Propylene glycol | — | — | 2.5 |
| Additives** | — | — | 2.525 |
| Ratio of THF:LVP | | | |

*Low vapor pressure (LVP-VOC) exempt cosolvents according to CARB in in the Regulation for Reducing Emissions from Consumer Products (title 17, California Code of Regulations, section 94508)
**additives include corrosion inhibitors and antioxidant

TABLE 8

Comparison of Time (min) to Strip paint from white car door

| Ex. | Spot 1 (min) | Spot 2 (min) | Layers stripped |
|---|---|---|---|
| V1.42 | 18.5 | 19.75 | Clear/base/primer |
| V1.47 | 16.25 | 16.75 | Clear/base/primer |
| V1.49 | 11 | 11.25 | Clear/base/primer |

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A single-phase paint remover composition comprising:
   (a) from 15 wt % to 49.5 wt % tetrahydrofuran (THF), based on the total weight of the composition;
   (b) from 1 wt % to 15 wt % a low vapor pressure (LVP) coupling co-solvent based on the total weight of the composition, the LVP coupling co-solvent comprising an alkanediol;
   (c) an amine with a molar volume of <100 cm$^3$/mol; and
   (d) water at a concentration of greater than 20 wt % of an overall concentration of the single-phase paint remover composition.

2. The composition according to claim 1, wherein the LVP coupling co-solvent is 1,2-pentanediol or the LVP coupling co-solvent is 1,2-hexanediol, and wherein the LVP coupling co-solvent is present at a concentration of 2.5 wt % to 5 wt % of the overall concentration of the single-phase paint remover composition.

3. The composition according to claim 1, further comprising a secondary co-solvent.

4. The composition according to claim 3, wherein the secondary co-solvent is present at a concentration of 1 wt % to 10 wt % of the overall concentration of the single-phase paint remover composition.

5. The composition according to claim 4, wherein the secondary co-solvent is water miscible, and/or the secondary co-solvent is a glycol, a glycol ether, or a combination thereof.

6. The composition according to claim 5, wherein the secondary co-solvent is an alkylene glycol, an alkylene glycol ether, alcohol, or a combination thereof.

7. The composition according to claim 6, wherein the secondary co-solvent is propylene glycol, diethylene glycol monobutyl ether, or a combination thereof.

8. The composition according to claim 4, wherein the secondary co-solvent is propylene glycol.

9. The composition according to claim 8, wherein the LVP coupling co-solvent and the secondary co-solvent are present in the single-phase paint remover composition at a ratio ranging from 2:1 to 1:2 relative to one another.

10. The composition according to claim 4, wherein the secondary co-solvent is diethylene glycol monobutyl ether.

11. The composition according to claim 10, wherein the LVP coupling co-solvent and the secondary co-solvent are present in the single-phase paint remover composition at a ratio ranging from 2:1 to 1:2 relative to one another.

12. The composition of claim 5, wherein the secondary co-solvent includes at least one of propylene glycol or diethylene glycol monobutyl ether;
   wherein the secondary co-solvent is present at a concentration of 2 wt % to 5 wt % of the overall concentration of the single-phase paint remover composition; and
   wherein the LVP coupling co-solvent and secondary co-solvent are present in the single-phase paint remover composition at a ratio ranging from 1.5:1 to 1:1.5 relative to one another.

13. The composition according to claim 12, wherein water is present in the single-phase paint remover composition at concentration ranging from greater than 20 wt % to 40 wt % of the overall concentration of the single-phase paint remover composition.

14. The composition according to claim 13, wherein water is present in the single-phase paint remover composition at concentration ranging from greater than 20 wt % to 27.5 wt % of the overall concentration of the single-phase paint remover composition.

15. The composition according to claim 1, further comprising a solvent evaporation retarder.

16. The composition according to claim 1, further comprising a cellulosic thickener.

17. The composition according to claim 1, further comprising an amine containing corrosion inhibitor.

18. The composition according to claim 1, wherein the single-phase paint remover composition remains stable and exhibits no phase separation at a temperature of 50° C. for twenty-eight (28) days.

19. The composition according to claim 1, wherein the single-phase paint remover composition has a viscosity ranging from 1,000 cP to 20,000 cP at 20° C.

20. The composition according to claim 1, wherein the LVP coupling co-solvent and water are present in the single-phase paint remover at a ratio ranging from 1:5 to 1:2 relative to one another.

21. The composition according to claim 1, wherein the ratio of LVP coupling co-solvent to THF ranges from 1:19.8 to 1:9.9.

22. A method of making the single-phase paint remover composition of claim 1, comprising:
   (a) admixing from 15 wt % to 49.5 wt % tetrahydrofuran (THF), based on the total weight of the composition, with:
      (i) from 1 wt % to 15 wt % of a low vapor pressure (LVP) coupling co-solvent comprising an alkanediol;
      (ii) an amine with a molar volume of <100 cm$^3$/mol; and
      (iii) water at a concentration of greater than 20 wt % of an overall concentration of the single-phase paint remover composition; and
   (b) forming the single-phase paint remover composition.

23. A method of removing paint comprising:
   (a) applying the single-phase paint remover composition of claim 1 to a painted surface for a predetermined time period; and
   (b) after step (a), removing paint from the painted surface.

24. The method of claim 23, wherein the predetermined time period ranges for 5 minutes to 300 minutes.

25. The method of claim 23, wherein the painted surface is a single coating of paint.

26. The method of claim 23, wherein the painted surface includes a plurality of paint coatings.

27. The composition according to claim 14, wherein the LVP coupling co-solvent is 1,2-pentanediol and/or the LVP coupling co-solvent is 1,2-hexanediol, and wherein the LVP coupling co-solvent is present at a concentration of 2.5 wt % to 5 wt % of the overall concentration of the single-phase paint remover composition.

28. The composition according to claim 14, wherein the LVP coupling co-solvent is 1,2-pentanediol, and wherein the LVP coupling co-solvent is present at a concentration of 2.5 wt % to 5 wt % of the overall concentration of the single-phase paint remover composition.

* * * * *